(12) United States Patent
Zhu (10) Patent No.: US 12,328,606 B2
(45) Date of Patent: Jun. 10, 2025

(54) METHOD AND DEVICE FOR DETECTING CONTROL CHANNEL AND METHOD FOR TRANSMITTING INFORMATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 350 days.

(21) Appl. No.: 17/910,318

(22) PCT Filed: Mar. 12, 2020

(86) PCT No.: PCT/CN2020/079044
§ 371 (c)(1),
(2) Date: Sep. 8, 2022

(87) PCT Pub. No.: WO2021/179264
PCT Pub. Date: Sep. 16, 2021

(65) Prior Publication Data
US 2023/0117776 A1   Apr. 20, 2023

(51) Int. Cl.
*H04W 24/02* (2009.01)
*H04W 28/06* (2009.01)

(52) U.S. Cl.
CPC .......... *H04W 24/02* (2013.01); *H04W 28/06* (2013.01)

(58) Field of Classification Search
CPC ..... H04W 24/02; H04W 28/06; H04W 72/23; H04W 24/08; Y02D 30/70; H04L 5/0053
See application file for complete search history.

(56) References Cited

U.S. PATENT DOCUMENTS

| 2014/0018120 A1* | 1/2014 | Anbe | H04W 72/20 455/509 |
| 2014/0254559 A1* | 9/2014 | Tie | H04W 36/24 370/332 |
| 2015/0215793 A1* | 7/2015 | Siomina | H04W 64/00 455/456.1 |
| 2016/0087694 A1* | 3/2016 | Vilaipornsawai | H04L 5/0016 370/329 |

(Continued)

FOREIGN PATENT DOCUMENTS

| CN | 101699901 A | 4/2010 |
| CN | 105577317 A | 5/2016 |

(Continued)

OTHER PUBLICATIONS

International Search Report issued in Application No. PCT/CN2020/079044, dated Dec. 14, 2020, (4p).

(Continued)

*Primary Examiner* — Atique Ahmed
(74) *Attorney, Agent, or Firm* — Arch & Lake LLP; Shen Wang; Hao Tan (57) ABSTRACT

A method and a device for detecting a control channel and a method for transmitting information are provided. The method for detecting the control channel is applied in a terminal, and includes: in response to determining that a detection complexity of a to-be-detected control channel exceeds a detection capability range of the terminal, abandoning a detection of at least part of the to-be-detected control channel.

20 Claims, 7 Drawing Sheets

(56) References Cited

U.S. PATENT DOCUMENTS

| | | | | |
|---|---|---|---|---|
| 2017/0188371 A1* | 6/2017 | Kim | ............... | H04L 1/0015 |
| 2020/0053718 A1 | 2/2020 | Huang et al. | | |
| 2020/0187094 A1* | 6/2020 | Horiuchi | ............... | H04L 5/0064 |
| 2020/0383089 A1* | 12/2020 | Goto | ............... | H04L 1/1822 |
| 2021/0126737 A1* | 4/2021 | Zhang | ............... | H04L 5/0094 |
| 2022/0256529 A1* | 8/2022 | Xu | ............... | H04L 5/0053 |

FOREIGN PATENT DOCUMENTS

| | | | | |
|---|---|---|---|---|
| CN | 104717107 B | * | 3/2019 | ......... H04L 67/1097 |
| CN | 109644082 A | | 4/2019 | |
| CN | 109802732 A | | 5/2019 | |
| CN | 110149180 A | | 8/2019 | |
| CN | 110324127 A | | 10/2019 | |
| WO | 2019021489 A1 | | 1/2019 | |
| WO | 2020015623 A1 | | 1/2020 | |
| WO | 2020032774 A1 | | 2/2020 | |

OTHER PUBLICATIONS

The Second CNOA issued in Application No. 202080000506.6 dated Oct. 28, 2023 with English translation, (10p).
First Office Action of Chinese Application No. 202080000506.6 dated Nov. 17, 2022 with English translation, (15p).

* cited by examiner

METHOD AND DEVICE FOR DETECTING CONTROL CHANNEL AND METHOD FOR TRANSMITTING INFORMATION

CROSS-REFERENCE TO RELATED APPLICATIONS

The present application is the U.S. National Stage of International Application No. PCT/CN2020/079044 filed on Mar. 12, 2020, the entire contents of which are incorporated herein by reference for all purposes.

TECHNICAL FIELD

The present disclosure relates but is not limited to the field of wireless communication, and particularly, to a method and device for detecting a control channel, a method and device for transmitting information, a communication device and a storage medium.

BACKGROUND

Continuous appearance of new Internet applications such as a new generation of augment reality (AR), virtual reality (VR), and vehicle-to-vehicle communication has put forward higher requirements for wireless communication technology, driving the continuous development of wireless communication technology to meet the needs of the applications. At present, the cellular mobile communication technology is in the evolution stage of a new generation technology. An important feature of the new generation technology is to support flexible configuration of a plurality of service types. Different services have different requirements for wireless communication technology, for example, the enhanced mobile broadband (eMBB) mainly requires large bandwidth and high rate, the ultra reliable low latency communication (URLLC) mainly requires high reliability and low latency, and the massive machine type communication (mMTC) mainly requires a large number of connections. Therefore, the new generation of wireless communication system needs a flexible and configurable design to support the transmission of various services.

In recent years, with the rapid development of the technology of the Internet of Things, a large number of new applications have been developed, including sensor applications in the Industrial Internet of Things, wireless video surveillance in smart cities, and wearable devices such as wristbands, watches, and health and medical monitoring equipment. The mobile communication system needs to consider new optimization to reduce complexity, size, and power consumption of user equipment while meeting the requirement for service quality.

SUMMARY

The present disclosure provides a method and device for detecting a control channel, a method and device for transmitting information, a communication device and a storage medium.

A first aspect of the present disclosure provides a method for detecting a control channel, which is applied in a terminal, including:
in response to determining that a detection complexity of a to-be-detected control channel exceeds a detection capability range of the terminal, abandoning a detection of at least part of the to-be-detected control channel.

A second aspect of the present disclosure provides a method for transmitting information, which is applied in a base station, including:
receiving detection status information, where the detection status information is configured to indicate that a detection of at least part of a to-be-detected control channel is abandoned in response to determining that a detection complexity of the to-be-detected control channel exceeds a detection capability range of a terminal.

A third aspect of the present disclosure provides a communication device including a processor, a transceiver, a memory, and an executable program stored on the memory and being executable by the processor. Furthermore, the processor, when running the executable program, executes the method according to any one of the technical solutions in the first aspect or the second aspect.

A fourth aspect of the present disclosure provides a computer storage medium storing an executable program that, when being executed by a processor, can implement the method according to any one of the technical solutions in the first aspect or the second aspect.

It is to be understood that the foregoing general description and the following detailed description are exemplary and explanatory only and are not intended to limit the embodiments of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principle of the embodiments of the present disclosure.

DETAILED DESCRIPTION

Some embodiments will be described in detail herein, examples of which are illustrated in the accompanying drawings. When the following description is made with reference to the drawings, the same numerals in different drawings refer to the same or similar elements unless otherwise indicated. The implementations described in the embodiments below are not intended to represent all implementations of the embodiments of the present disclosure. Rather, they are merely examples of devices and methods according to some aspects of the embodiments of the present disclosure as recited in the appended claims.

The terminology used in the embodiments of the present disclosure is for the purpose of describing particular embodiments only and is not intended to limit the embodiments of the present disclosure. As used in the embodiments of the present disclosure and the appended claims, the singular forms "a", "an" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third and the like may be used in the embodiments of the present disclosure to describe various pieces of information, such information should not be limited by these terms. These terms are only used to distinguish the same type of information from each other. For example, first information may also be referred to as second information, and similarly, the second information may also be referred to as the first information, without departing from the scope of the embodiments of the present disclosure. Depending on the context, the word "if" as used herein may be interpreted as "at the time of" or "when" or "in response to determining".

Figure 1:
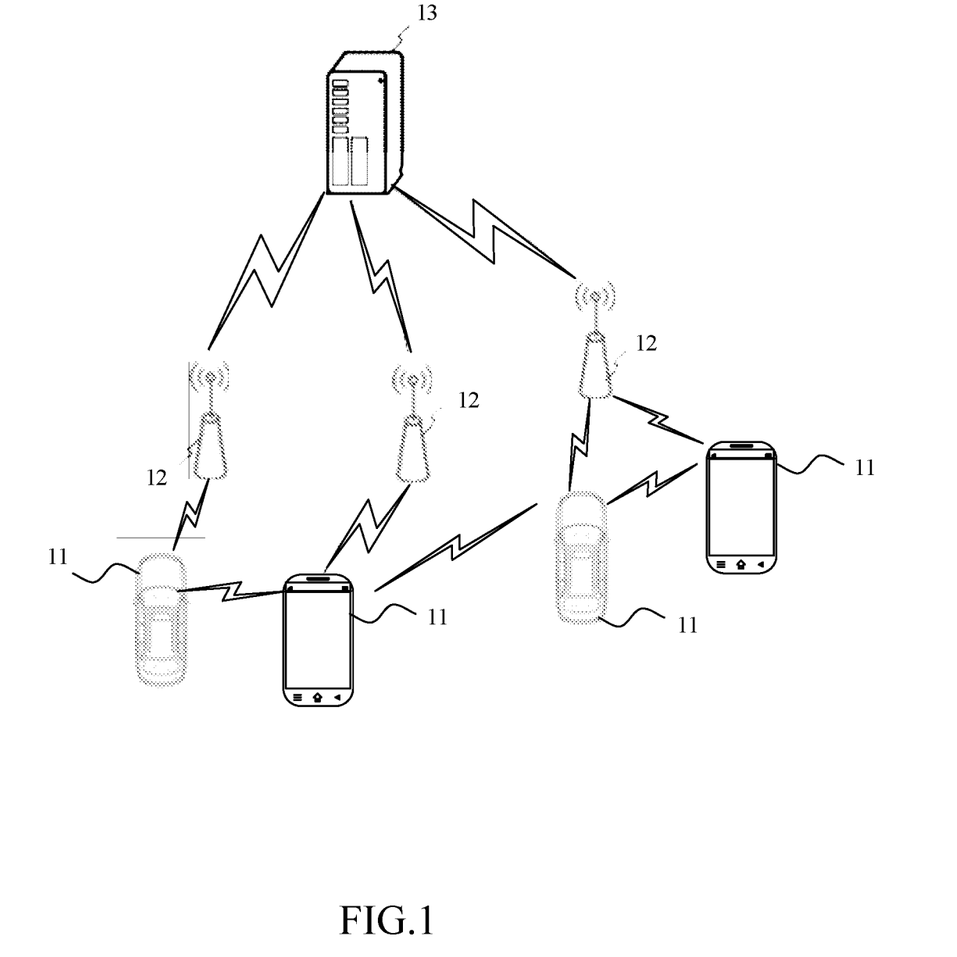
FIG. 1 is a schematic structural diagram of a wireless communication system according to an embodiment.

FIG. 1 shows a schematic structural diagram of a wireless communication system according to an embodiment of the present disclosure. As shown in FIG. 1, the wireless communication system is a communication system based on cellular mobile communication technology, and may include a plurality of terminals 11 and a plurality of base stations 12.

The terminal 11 may be a device that provides voice and/or data connectivity to a user. The terminal 11 may communicate with one or more core networks via radio access network (RAN). The terminal 11 may be an IoT terminal such as a sensor device, a mobile phone (or "cellular" phone), and may be a computer having the IoT terminal, which, for example, may be a stationary, portable, pocket-sized, hand-held, computer-built-in, or vehicle-mounted device. For example, the terminal 11 may be a station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be an in-vehicle device, for example, a trip computer with a wireless communication function, or a wireless communication device connected to an external trip computer. Alternatively, the terminal 11 may also be a roadside device, for example, may be a streetlight, a signal light, or other roadside device having a wireless communication function.

The base station 12 may be a network-side device in a wireless communication system. The wireless communication system may be a 4th generation mobile communication (4G) system, also known as a long term evolution (LTE) system. Alternatively, the wireless communication system may be a 5G system, also known as a new radio (NR) system or a 5G NR system. Alternatively, the wireless communication system may be a next-generation system of the 5G system. The access network in the 5G system may be called NG-RAN (New Generation-Radio Access Network). Alternatively, it may be a MTC system.

The base station 12 may be an evolved base station (eNB) employed in the 4G system. Alternatively, the base station 12 may be a base station (gNB) that adopts a centralized distributed architecture in the 5G system. When adopting the centralized distributed architecture, the base station 12 usually includes a central unit (CU) and at least two distributed units (DUs). The central unit is provided with a protocol stack of a packet data convergence protocol (PDCP) layer, a radio link control (RLC) layer, and a medium access control (MAC) layer. The distributed unit is provided with a physical (PHY) layer protocol stack. The specific implementation manner of the base station 12 is not limited in the embodiments of the present disclosure.

A wireless connection may be established between the base station 12 and the terminal 11 through a wireless radio. In different embodiments, the wireless radio is a wireless radio based on the fourth generation mobile communication network technology (4G) standard; or the wireless radio is a wireless radio based on the fifth generation mobile communication network technology (5G) standard, for example, the wireless radio is a new radio; or, the wireless radio may also be a wireless radio of a 5G-based next generation mobile communication network technology standard.

In some embodiments, an E2E (end-to-end) connection may also be established between the terminals 11, for example, in scenarios such as V2V (vehicle to vehicle) communication, V2I (vehicle to infrastructure) communication and V2P (vehicle to pedestrian) communication in vehicle to everything (V2X) communication.

In some embodiments, the above wireless communication system may further include a network management device 13.

The plurality of base stations 12 are respectively connected to the network management device 13. The network management device 13 may be a core network device in the wireless communication system, for example, the network management device 13 may be a mobility management entity (MME) in an evolved packet core network (EPC). Alternatively, the network management device may also be other core network devices, such as a serving gateway (SGW), public data network gateway (PGW), policy and charging rules function unit (PCRF), home subscriber server (HSS) or the like. The implementation of the network management device 13 is not limited in the embodiments of the present disclosure.

Figure 2:
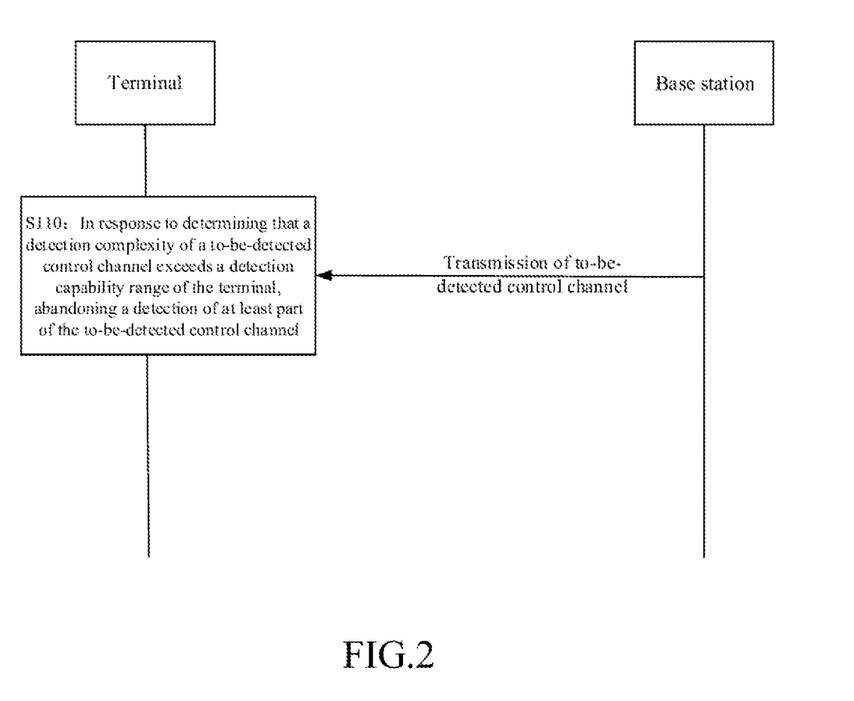
FIG. 2 is a schematic flowchart of a method for detecting a control channel according to an embodiment.

As shown in FIG. 2, an embodiment of the present disclosure provides a method for detecting a control channel, which is applied in a terminal. The method includes:

S110, in response to determining that a detection complexity of a to-be-detected control channel exceeds a detection capability range of the terminal, abandoning a detection of at least part of the to-be-detected control channel.

According to the technical solution provided by the embodiment of the present disclosure, when a terminal finds that a detection complexity of a to-be-detected control channel exceeds a detection capability range of the terminal, the terminal may abandon a detection of at least part or all of the to-be-detected control channel. In this way, it may reduce the phenomenon in which when the terminal finds that the detection complexity of the to-be-detected control channel exceeds the detection capability range of the terminal, the terminal still performs unnecessary detections of the to-be-detected control channel, resulting in waste of power consumption and invalid detection of the terminal.

The terminal provided in an embodiment of the present disclosure may be various types of terminals, for example, a common long term evolution (LTE) terminal, or a wearable device or a lightweight terminal. A common terminal includes but is not limited to a mobile phone, a tablet computer, an in-vehicle device or a wearable device.

These lightweight terminals may be applied to a closed environment or semi-enclosed environment, and a typical lightweight terminal includes but is not limited to an industrial sensor, a monitoring device and/or a medical device, etc.

S110 may include:
in response to determining that the detection complexity of the to-be-detected control channel exceeds the detection capability range of the terminal, abandoning the detection of the at least part of the to-be-detected control channel according to a preset rule;
or,
in response to determining that the detection complexity of the to-be-detected control channel exceeds the detection capability range of the terminal, abandoning the detection of the at least part of the to-be-detected control channel according to a rule dynamically transmitted by a base station.

The preset rule herein is pre-stored in the terminal, for example, the preset rule is preset in the terminal before the terminal leaves the factory, or is written into a communication protocol stored in the terminal. In an embodiment of the present disclosure, when the terminal finds that the detection complexity of the to-be-detected control channel exceeds the detection capability range of the terminal, the terminal may completely abandon the detection of the control channel, or abandon the detection of the control channel which is beyond the detection capability range of the terminal. For example, according to the preset rule, the terminal may completely abandon the detection of the control channel or abandon the detection of the control channel which is beyond the detection capability of the terminal.

The to-be-detected control channel here includes but is not limited to a physical downlink control channel (PDCCH). The PDCCH may include a common PDCCH or a dedicated PDCCH.

The detection of the to-be-detected control channel in an embodiment of the present disclosure includes: detecting pilot frequency information carried on a resource of the to-be-detected control channel, obtaining channel condition information and detecting control information carried by the-be-detected control channel, and decoding the received control information transmitted on the control channel.

That the detection complexity of the to-be-detected control channel exceeds the detection capability range of the terminal includes but is not limited to at least one of:
the number of frequency domain resources occupied by the to-be-detected control channel is greater than the number of frequency domain resources that the terminal can support for detection;
the frequency domain bandwidth occupied by the to-be-detected control channel is greater than the maximum bandwidth supported by the terminal; and
the frequency domain bandwidth occupied by the to-be-detected control channel is greater than the maximum bandwidth currently configured by the terminal.

The above are only examples of that the detection complexity of the to-be-detected control channel exceeds the detection capability range of the terminal, and the specific implementation thereof is not limited to any one of the above.

In an embodiment, the preset rule may be pre-stored in the terminal. For example, the preset rule may be a rule defined in a communication protocol. In this case, the preset rule may be stored in the terminal when the terminal leaves the factory.

In another embodiment, the preset rule may be transmitted by a network element on the network side (e.g., the radio network side and/or the core network side). For example, the terminal receives the preset rule transmitted by the base station. For example, the base station broadcasts the preset rule in a cell through a broadcast message, or transmits the preset rule through radio resource control (RRC) signaling in a unicast way, or transmits the preset rule through multicast signaling in a multicast way. In short, the terminal may receive the preset rule from the base station in advance, so that when performing the control channel detection, the terminal abandons the detection of the at least part or all of the control channel according to the preset rule if the terminal finds that the detection complexity of the to-be-detected control channel exceeds the detection capability range of the terminal. In this way, it may reduce the phenomenon in which when the terminal finds that the detection complexity of the to-be-detected control channel exceeds the detection capability range of the terminal, the terminal still performs unnecessary detections of the to-be-detected control channel, resulting in waste of power consumption and invalid detection of the terminal.

In some embodiments, if the base station knows the detection capability range of the terminal in advance, the base station may know, according to the preset rule known to both the base station and the terminal, whether the terminal will detect the to-be-detected control channel or which part of the to-be-detected control channel will be detected by the terminal, therefore the base station may target the information transmission on the control channel, thereby reducing the waste of power consumption caused by the forced detection of the terminal, and at the same time enabling the terminal to detect the control channel that it needs to detect as much as possible, which reduces the service delay caused by non-detection or unsuccessful detection of the control channel and thus improves the service transmission efficiency.

In some embodiments, S110 may include:
when a number of resources corresponding to the to-be-detected control channel exceeds a number of detections supported by the terminal, abandoning the detection of the at least part of the to-be-detected control channel.

The number of resources includes but is not limited to the number of frequency domain resources and/or the number of time domain resources. If the number of resources of the to-be-detected control channel exceeds the number of detections supported by the terminal, that is, the detection capability range of the terminal cannot cover the detection complexity of the to-be-detected control channel, the terminal will abandon the detection of at least part or all of the to-be-detected control channel according to preset rule.

When the detection of the at least part of the to-be-detected control channel is abandoned according to the preset rule, the method includes one of the following:
abandoning, according to a priority of a service scheduled by the to-be-detected control channel, the detection of the to-be-detected control channel with a scheduled priority meeting a first preset condition;
abandoning, according to a channel condition of the terminal, a detection of a part of the to-be-detected control channel corresponding to an aggregation level not matching a current channel condition; and
abandoning, according to a delay requirement of a service scheduled by the to-be-detected control channel, the detection of the to-be-detected control channel with a scheduled delay requirement meeting a second preset condition.

For example, the priority of the URLLC service is higher than that of the eMBB service. When the detection complexity of the to-be-detected control channel exceeds the detection capability of the terminal, if the terminal only abandons the detection of a part of the to-be-detected control channel, the part of the control channel that is still to be detected is the part of the control channel scheduling the transmission of the URLLC service, and the detection regarding the eMBB service is abandoned, so that the terminal can receive the scheduling information of high-priority services such as URLLC service in the first time, so as to timely perform the transmission of the service with high-priority.

The terminal may receive a cell reference signal, and determine a current channel condition according to a signal strength of the cell reference signal. For example, if the signal strength is high, the current channel condition may be considered to be good; and if the signal strength is low, the current channel condition may be considered to be poor.

In order to maximize the information detection regarding the detection of the at least part of the to-be-detected control channel, and at the same time to ensure the success rate of the detection of the at least part of the to-be-detected control channel, the detection of the part of the to-be-detected control channel corresponding to the aggregation level not matching the current channel condition may be abandoned according to the channel condition of the control channel and based on a preset rule.

The aggregation level indicates the number of control channel elements (CCE) occupied by one control channel. Taking the PDCCH as an example, the PDCCH has 5 formats, and the corresponding aggregation level is {1, 2, 4, 8, 16}. The higher the aggregation level, the more resources occupied by the corresponding PDCCH transmission.

For example, abandoning, according to the channel condition of the terminal, the detection of the part of the to-be-detected control channel corresponding to the aggregation level not matching the current channel condition includes:

when the channel condition meets a preset condition, abandoning a detection of a part of the to-be-detected control channel corresponding to the aggregation level greater than a preset threshold; and when the channel condition does not meet the preset condition, abandoning a detection of a part of the to-be-detected control channel corresponding to the aggregation level smaller than the preset threshold.

That the channel condition meets the preset condition includes but is not limited to:

when the signal strength of the cell reference signal is greater than a strength threshold, it may be considered that the preset condition is met, and the detection of the part of the control channel with larger CCE is abandoned; and when the signal strength of the cell reference signal is less than or equal to the strength threshold, it may be considered that the preset condition is not met, and the detection of the part of the control channel with smaller CCE is abandoned.

Figure 3A:
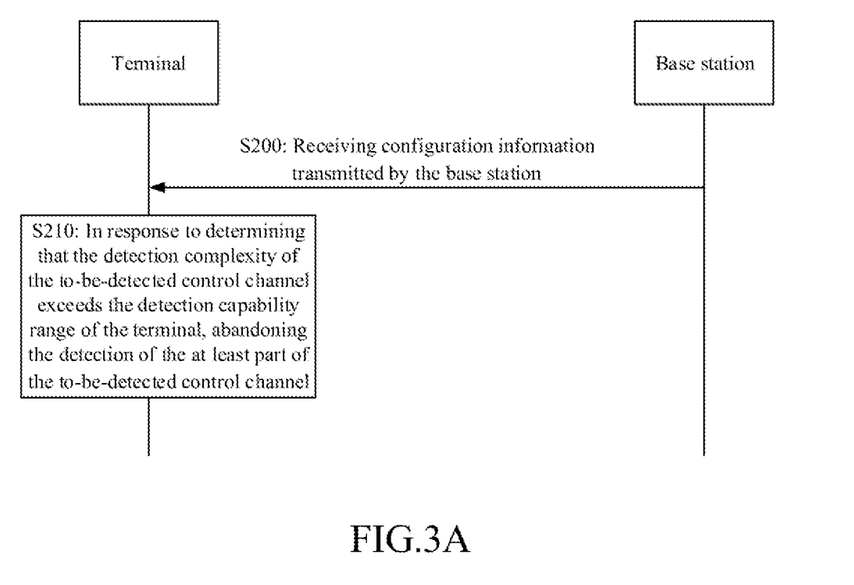
FIG. 3A is a schematic flowchart of a method for detecting a control channel according to an embodiment.

In some embodiments, as shown in FIG. 3A, the method includes:

S200, receiving configuration information transmitted by a base station, wherein the configuration information is configured to indicate a detection configuration of the control channel; and S210, in response to determining, according to the configuration information, that the detection complexity of the to-be-detected control channel exceeds the detection capability range of the terminal, abandoning the detection of the at least part of the to-be-detected control channel.

The configuration information may include indication information such as the number of resources of the control channel to be detected by the terminal or the channel bandwidth. At this time, the terminal may determine, according to the configuration information and the termina capability thereof, whether the detection complexity of the control channel to be detected currently exceeds the detection capability range of the terminal.

In some other embodiments, for some types of PDCCH, the detection complexity of the to-be-detected control channel may be pre-specified in the communication protocol. In this case, it is not limited to determine the detection complexity of the to-be-detected control channel according to the configuration information.

In an embodiment, the method further includes: transmitting detection status information of the to-be-detected control channel. The detection status information at least includes indication information regarding whether a control channel detection has been performed according to the configuration information of the base station.

For example, the base station may or may not transmit the configuration information thereof. If the configuration information is not transmitted, the base station may determine whether the terminal performs the control channel measurement according to the configuration information of the base station according to the detection status information transmitted by the terminal. At this time, the detection status information is indication information of the detection status that the terminal actually performs the channel detection, but after the information is compared with the configuration information, it may be obtained whether the terminal performs the detection according to the configuration information. If the base station transmits the configuration information, the terminal may receive the configuration information transmitted by the base station. At this time, the terminal may generate the detection status information including a comparison result according to the comparison between the actual detection result and the configuration information.

Figure 3B:
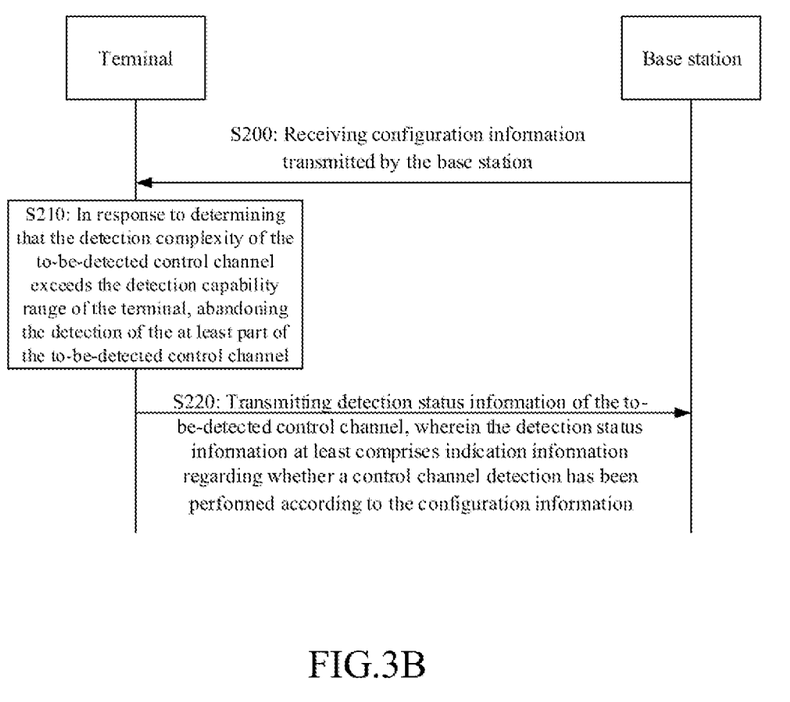
FIG. 3B is a schematic flowchart of a method for detecting a control channel according to an embodiment.

For another example, as shown in FIG. 3B, the method further includes:

S200, receiving configuration information transmitted by a base station, wherein the configuration information is configured to indicate a detection configuration of the control channel;

S210, in response to determining, according to the configuration information, that the detection complexity of the to-be-detected control channel exceeds the detection capability range of the terminal, abandoning the detection of the at least part of the to-be-detected control channel; and S220, transmitting detection status information of the to-be-detected control channel, wherein the detection status information at least includes indication information regarding whether a control channel detection has been performed according to the configuration information.

The configuration information may be configured to indicate a detection configuration of the control channel to the terminal. The base station may determine the configuration information according to the detection status information of the to-be-detected control channel transmitted by the terminal, so that the configuration information of the control channel that the terminal needs to detect better matches the detection capability of the terminal.

In an embodiment, the detection configuration may include:
  resource information of a time-frequency resource corresponding to the to-be-detected control channel.

In another embodiment, the detection configuration may further include at least one of:
  indication information of the control channel that the terminal needs to detect;
  indication information of the control channel, the detection of which may be abandoned by the terminal;
  indication information of the part of the control channel that needs to be detected by the terminal;
  indication information of the part of the control channel, the detection of which may be abandoned by the terminal;
  indication information of the bandwidth width, the detection of which may be abandoned by the terminal;
  frequency indication information of the frequency band, the detection of which may be abandoned by the terminal.

The above is just an example, and in specific implementation, the detection configuration may be any information that directs the terminal to perform the control channel detection.

In an embodiment, the terminal may obtain the configuration information by receiving RRC signaling, MAC signaling or DCI. When the terminal finds that the detection complexity of the to-be-detected control channel exceeds the detection capability range of the terminal, the terminal may abandon the detection of at least part or all of the to-be-detected control channel in combination with the preset rule and the configuration information. Referring to the configuration information transmitted by the base station, the terminal ensures that the actual detection of the control channel by the terminal is consistent with the detection of the terminal expected by the base station as much as possible. However, due to the limited terminal capability and/or channel condition, the part actually detected by the terminal may be inconsistent with the part that the base station expects the terminal to detect. In this case, the terminal may transmit the detection status information in combination with the configuration information transmitted by the base station. The detection status information may at least be configured to indicate whether the actual detection of the terminal covers the part that the configuration information directly or indirectly indicates to detect.

In another embodiment, the terminal directly abandons the detection of at least part or all of the to-be-detected control channel according to the preset rule, and after the detection is completed, the terminal transmits the detection status information according to the actual detection and the configuration information.

With the transmitted detection status information, the base station may know which scheduling information and/or control information of the control channel the terminal currently receives, whether to retransmit the control information if necessary, or confirm that the terminal has received the corresponding control information.

In some embodiments, the method further includes:
  determining a time point of transmitting the detection status information according to a time relationship between a time point of detecting the control signaling and the time point of transmitting the detection status information.

The base station and/or the terminal may predefine the time relationship between the time point of detecting the control signaling and the time point of transmitting the detection status information. In this way, after the detection of the to-be-detected control channel is completed, according to the time relationship and without additional scheduling by the base station, the terminal may transmit the detection state information on a specific time domain resource, which has a small scheduling signaling overhead.

The pre-defined time relationship here may be pre-defined in the communication protocol, or may be notified to the terminal in the manner of being notified in advance by the base station.

In some embodiments, the time relationship may include a time offset between the detecting time point and the transmitting time point. For example, in symbols, the time relationship may be the number of symbols in the interval between the detecting time point and the transmitting time point. Of course, this is just an example, and the specific implementation is not limited to this example.

In some embodiments, the detection status information includes indication information indicating whether the control channel is detected according to the configuration information, and detection result identification information of a detected control channel.

The detection result identification information is configured to identify the detected control channel. In this way, after receiving the detection status information, the base station knows which control channel the detection status information transmitted by the terminal directs to.

When the detection status information further includes the detection result identification information, the detection status information may or may not be transmitted at the transmitting time determined based on the time relationship in the foregoing embodiment. Since the transmitting time in the foregoing embodiment is determined based on the time relationship, when the base station receives the detection status information, it knows which control channel the detection status information directs to.

If the detection status information includes both the indication information and the detection result identification information, the detection result identification information clearly indicates which control channel the indication information included in the detection status information directs to, so it is not necessary to strictly follow the transmitting time determined based on the aforementioned time relationship to transmit the detection status information.

In some embodiments, the method further includes:
  receiving the configuration information updated by the base station according to the detection status information.

In an embodiment of the present disclosure, in order to implement effective detection by the terminal as much as possible, if the base station receives the detection status information, it may update the configuration information transmitted by itself, so as to facilitate subsequent more effective detection by the terminal.

In some embodiments, the method further includes:
  obtaining a preset rule which is pre-defined;
  or,
  receiving the preset rule transmitted by the base station.

Figure 4:
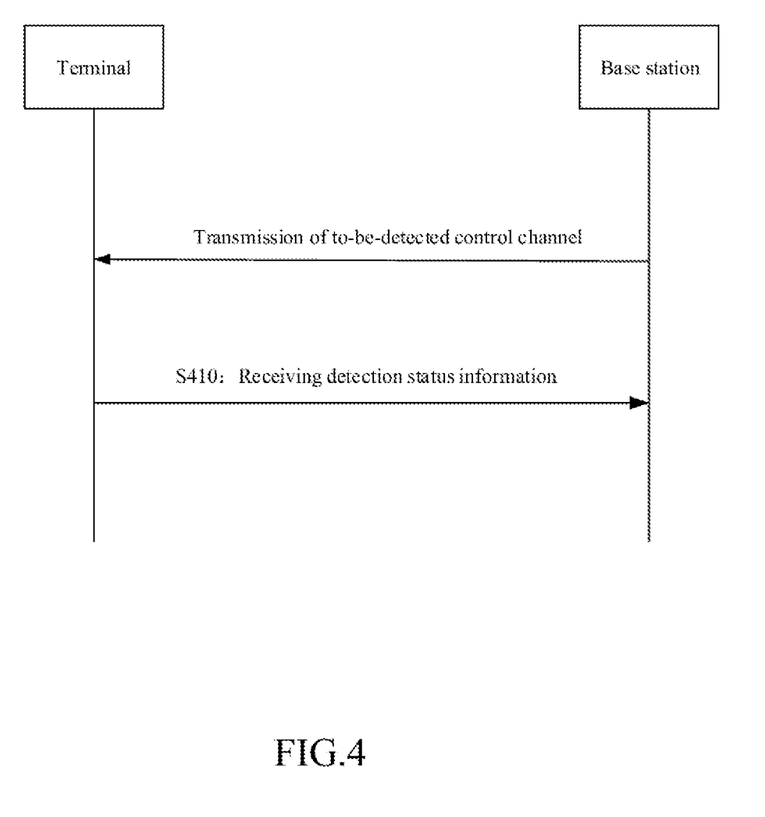
FIG. 4 is a schematic flowchart of a method for transmitting information according to an embodiment.

As shown in FIG. 4, an embodiment provides a method for transmitting information, which is applied in a base station. The method includes:

S410, receiving detection status information, wherein the detection status information is configured to indicate that a detection of at least part of a control channel is abandoned in response to determining that a detection complexity of the control channel exceeds a detection capability range of a terminal.

The preset rule may help the terminal to determine abandoning the detection of at least part or all of the to-be-detected control channel after the terminal determines that the detection complexity of the to-be-detected control channel exceeds the detection capability range of the terminal.

The control channel to be detected may be referred to as the to-be-detected control channel. The control channel mentioned in the embodiment of the present disclosure applied to the base station corresponds to the to-be-detected control channel in any technical solution applied to the terminal discussed above.

In some embodiments, the method further includes:
transmitting, by the base station, the preset rule through any one of broadcast, multicast or unicast signaling.

The preset rule may be configured for the terminal to determine at least partially abandoning the detection of the control channel when the detection complexity of the control channel exceeds the detection capability range of the terminal.

In some embodiments, the method further includes:
transmitting configuration information, wherein the configuration information is configured to indicate a detection configuration of the control channel, and the detection configuration is also configured for the terminal to determine that the detection complexity of the to-be-detected control channel exceeds the detection capability range of the terminal.

Through the transmitted configuration information, the terminal may be informed which control channel needs to be detected, and the terminal may also determine whether the detection complexity of the to-be-detected control channel exceeds the detection capability of the terminal according to a parameter such as the number of resources of the detected control channels indicated by the configuration information. Such configuration information realizes the indication of various contents, which has a characteristic of easy implementation.

Figure 5:
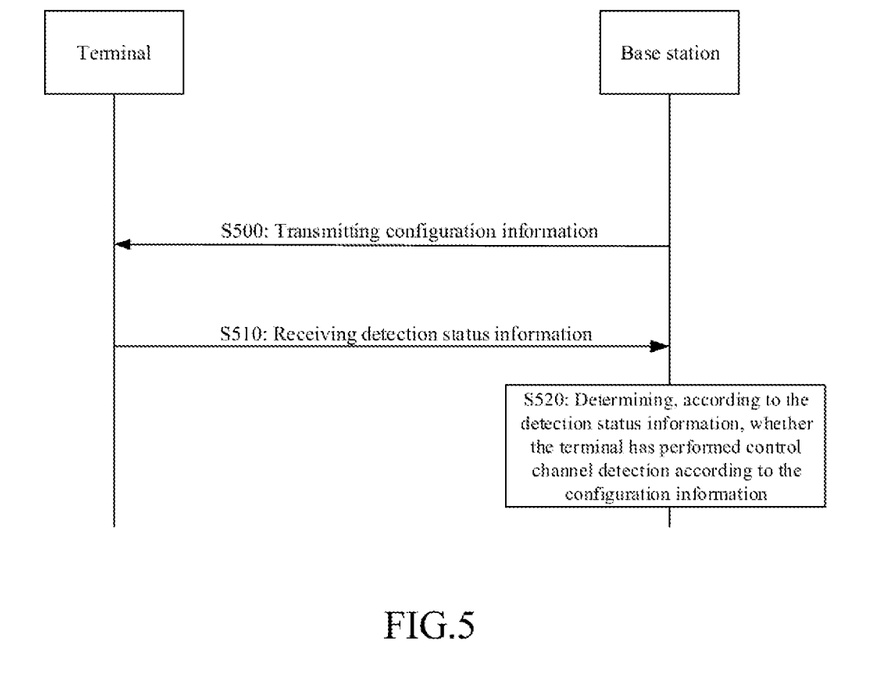
FIG. 5 is a schematic flowchart of another method for transmitting information according to an embodiment.

In some embodiments, the method for transmitting information further includes: determining, according to the detection status information, whether the terminal has performed control channel detection according to the configuration information of the base station. For example, as shown in FIG. 5, the method for transmitting information further includes:

S500, transmitting configuration information; and
S510, determining, according to the detection status information, whether the terminal has performed control channel detection according to the configuration information of the base station.

In an embodiment of the present disclosure, the base station may transmit configuration information. The configuration information may be configured to indicate a detection configuration of the to-be-detected control channel to the terminal.

When the terminal completes the detection of the control channel or does not perform the detection of the control channel, it may transmit the detection status information to the base station, so that the base station determines whether control information transmitted by the control channel is successfully transmitted to the terminal. The control information includes but is not limited to scheduling information for various service transmissions and the like.

In some embodiments, the method further includes:
after receiving the detection status information, if the base station does not transmit the configuration information, determining, according to the detection status information and the configuration information, whether the terminal performs control channel detection according to the configuration information.

For the relevant descriptions of the detection status information and the configuration information, reference may be made to the descriptions in the corresponding parts of the foregoing embodiments, which will not be repeated here.

In some embodiments, the method further includes:
transmitting updated configuration information to the terminal according to the detection status information.

In this way, the base station may directly adjust the configuration information in time according to the detection status information transmitted by the terminal, and transmit the updated configuration information to the terminal, thereby improving the effective detection of the control channel by the terminal.

In some embodiments, the detection status information directly or indirectly reflects the detection capability range of the terminal, and the base station may adjust the configuration information adaptively, so that the detection range of the terminal indicated in the configuration information is consistent with the actual detection capability range of the terminal, thereby improving the effective detection of the terminal.

Figure 6:
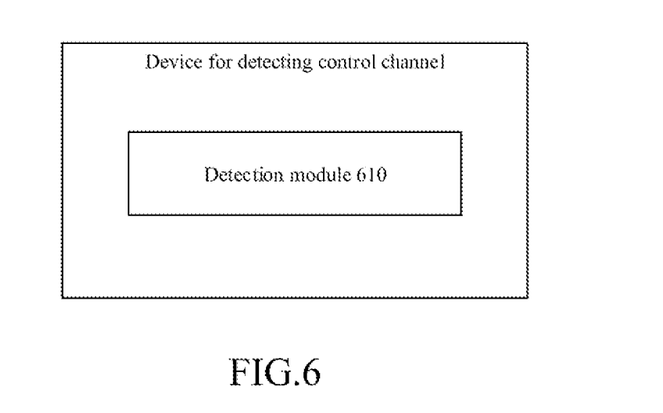
FIG. 6 is a schematic structural diagram of a device for detecting a control channel according to an embodiment.

As shown in FIG. 6, an embodiment provides a device for detecting a control channel, which is applied in a terminal. The device includes:
a detection module 610, configured to in response to determining that a detection complexity of a to-be-detected control channel exceeds a detection capability range of the terminal, abandon a detection of at least part of the to-be-detected control channel.

In some embodiments, the detection module 610 may be a program module. The program module, after being executed by the processor, can cause that when the detection complexity of the to-be-detected control channel exceeds the detection capability range of the terminal, the detection of at least part of the to-be-detected control channel is abandoned.

In another embodiment, the detection module 610 may be a combination module of software and hardware. The combination module of software and hardware includes but is not limited to various programmable arrays, and the programmable array includes but is not limited to a complex programmable array or a field programmable array.

In still another embodiment, the detection module 610 may include a pure hardware module, and the pure hardware module includes but is not limited to an application specific integrated circuit.

In some embodiments, the detection module 610 is configured to: in response to determining that a number of resources corresponding to the to-be-detected control channel exceeds a number of detections supported by the terminal, abandon the detection of the at least part of the to-be-detected control channel.

In some embodiments, the detection module 610 is configured to: in response to determining that the detection complexity of the to-be-detected control channel exceeds the detection capability range of the terminal, completely or partially abandon the detection of the to-be-detected control channel according to a preset rule.

In some embodiments, when abandoning the detection of the at least part of the to-be-detected control channel, the detection module 610 is configured to perform one of:
abandoning, according to a priority of a service scheduled by the to-be-detected control channel, the detection of the to-be-detected control channel with a scheduled priority meeting a first preset condition;

abandoning, according to a channel condition of the terminal, a detection of a part of the to-be-detected control channel corresponding to an aggregation level not matching a current channel condition; and abandoning, according to a delay requirement of a service scheduled by the to-be-detected control channel, the detection of the to-be-detected control channel with a scheduled delay requirement meeting a second preset condition.

In some embodiments, the detection module 610 is configured to: in response to determining that the channel condition meets a preset condition, abandon a detection of a part of the to-be-detected control channel corresponding to the aggregation level greater than a preset threshold; and in response to determining that the channel condition does not meet the preset condition, abandon a detection of a part of the to-be-detected control channel corresponding to the aggregation level smaller than the preset threshold.

In some embodiments, the device further includes:
a first receiving module, configured to receive configuration information transmitted by a base station, wherein the configuration information is configured to indicate a detection configuration of the control channel, and
the detection module is further configured to:
in response to determining, according to the configuration information, that the detection complexity of the to-be-detected control channel exceeds the detection capability range of the terminal, abandon the detection of the at least part of the to-be-detected control channel.

In some embodiments, the device further includes:
a first transmission module, configured to transmit detection status information of the to-be-detected control channel, wherein the detection status information at least includes indication information regarding whether a control channel detection has been performed according to the configuration information of the base station.

In some embodiments, the device further includes:
a first determination module, configured to determine a time point of transmitting the detection status information according to a time relationship between a time point of detecting the control signaling and the time point of transmitting the detection status information.

In some embodiments, the detection status information further includes detection result identification information of a detected control channel.

In some embodiments, the first receiving module is further configured to: receive the configuration information updated by the base station according to the detection status information.

In some embodiments, the device further includes:
an acquisition module, configured to acquire a preset rule which is pre-defined;
or
the first receiving module is configured to receive the preset rule transmitted by the base station.

Figure 7:
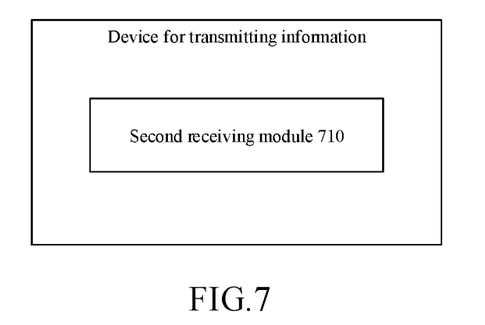
FIG. 7 is a schematic structural diagram of a device for transmitting data according to an embodiment.

As shown in FIG. 7, an embodiment provides a device for transmitting information, which is applied in a base station. The device includes:
a second receiving module 710, configured to receive detection status information, wherein the detection status information is configured to indicate that a detection of at least part of a control channel is abandoned in response to determining that a detection complexity of the control channel exceeds a detection capability range of a terminal.

In some embodiments, the second receiving module 710 may be a program module. After the program module is executed by a processor, the base station can receive detection status information.

In another embodiment, the second receiving module 710 may be a combination module of software and hardware. The combination module of software and hardware includes but is not limited to various programmable arrays, and the programmable array includes but is not limited to a complex programmable array or a field programmable array.

In still another embodiment, the second receiving module 710 may include a pure hardware module, and the pure hardware module includes but is not limited to an application specific integrated circuit.

In some embodiments, the device further includes:
a second transmission module, configured to transmit configuration information, wherein the configuration information is configured to indicate a detection configuration of a control channel, and the detection configuration is also configured for the terminal to determine that the detection complexity of the to-be-detected control channel exceeds the detection capability range of the terminal.

In another embodiments, the device further includes:
a second determination module, configured to determine, according to the detection status information, whether the terminal has performed control channel detection according to the configuration information of the base station.

For example, the detection status information is configured to indicate that the detection of the control channel is at least partially abandoned when the detection complexity of the control channel exceeds the detection capability range of the terminal.

In some embodiments, the second transmission module is further configured to transmit, according to the detection status information, updated configuration information to the terminal.

The configuration information for the terminal to detect the control signaling is acquired by acquiring high-layer signaling transmitted by the base station. The terminal detects whether there is control signaling for itself at a corresponding time-frequency domain position based on the configuration information. The high-layer signaling includes but is not limited to RRC signaling and/or MAC signaling.

Before detecting the control signaling, the terminal needs to obtain the channel condition, which needs to be obtained by measuring the pilot frequency information carried in the resource range to be detected. At present, the resource granularity of channel detection is based on a resource element group bundle (REG bundle) as a unit.

An embodiment of the present disclosure provides a method for reducing a complexity of channel detection performed during control signaling detection. A base station transmits configuration information for control signaling detection. When a terminal finds that the complexity of the channel detection that needs to be performed exceeds the detection capability of the terminal during the control signaling detection, the terminal may abandon the detection of the control signaling on at least part or all of resources based on a pre-defined rule or a rule notified by signaling. In an implementation, the terminal may also transmit its detection status, and the base station adjusts a detection status parameter of the configuration information based on the detection status transmitted by the terminal.

At a time point for detecting the control signaling, when the terminal finds that the number of resources (such as the number of CCEs) required for channel detection when performing the control signaling detection exceeds the detection capability of the terminal itself, the terminal determines, based on a rule, the resource on which the channel detection is to be performed. The rule may be predefined, or notified to the terminal by the base station through high-layer signaling and physical layer signaling. The predefined rule may be to abandon the detection of the control signaling at the detection time point, or to determine the resource to be detected based on the priority.

In an embodiment, when the detection capability is exceeded, the terminal completely abandons the control signaling detection at the time point of the current control signaling detection according to the rule.

In another embodiment, when the detection capability is exceeded, the terminal abandons at least part of the control signaling detection of the aggregation level according to the rule. For example, the candidate resource position (candidate) with a large aggregation level in the detection configuration is abandoned. Alternatively, based on the determination of the terminal on the channel condition, it is determined which candidate resource position (candidate) detection is to be abandoned. For example, when the channel condition of the terminal is good, the candidate resource position (candidate) with a large aggregation level in the detection configuration is abandoned; and when the channel condition of the terminal is poor, the candidate resource position with a small aggregation level in the detection configuration position (candidate) is abandoned.

In another embodiment, when the detection capability is exceeded, the terminal abandons the detection of a certain type of control signaling according to a rule. For example, when the terminal needs to simultaneously detect control signaling for a service with a higher latency sensitivity and a service with a lower latency sensitivity at a certain detection time point, the terminal may abandon the detection of the control signaling for the service with the lower latency sensitivity.

The terminal may also need to transmit indication information of whether the control signaling is detected completely according to the configuration information. There are the following manners:

manner 1: a time relationship between a detection time point of the control signaling and a transmission time point of the indication information is pre-defined, and the terminal transmits the indication information for the corresponding detection time point at the transmission time point; and manner 2: the terminal transmits the indication information at the transmission time point and identification information regarding which control signaling detection time point the indication information directs to.

The base station may also determine, according to the indication information, whether the configuration information for the control signaling detection of the terminal needs to be changed.

In a word, the embodiment of the present disclosure provides a method for reducing a complexity of channel detection performed during control signaling detection. Through a pre-defined rule or a rule notified by signaling, the terminal may detect the control signaling when the detection capability of the terminal itself is met, which avoids the situation where the control signaling cannot be obtained due to limited detection capability.

An embodiment of the present disclosure provides a communication device including a processor, a transceiver, a memory, and an executable program stored on the memory and being executable by the processor. The processor, when running the executable program, executes the method for detecting the control channel applied in the terminal according to any one of the technical solutions described above or executes the method for transmitting information applied in the base station according to any one of the technical solutions described above.

The communication device may be the aforementioned base station or terminal.

The memory may include various types of storage media, which are non-transitory computer storage media that can continue to memorize and store information on the communication device after the power is off. Here, the communication device includes a base station or a user equipment.

The processor may be connected to the memory through a bus or the like, for reading executable programs stored on the memory, for example, at least one of the methods shown in FIGS. 2 to 5.

An embodiment of the present disclosure provides a computer storage medium storing an executable program that, when being executed by a processor, can implement the method according to any one of the technical solutions in the first aspect or the second aspect, for example, at least one of the methods shown in FIG. 2, FIG. 3A, FIG. 3B, and FIGS. 4 to 5.

Figure 8:
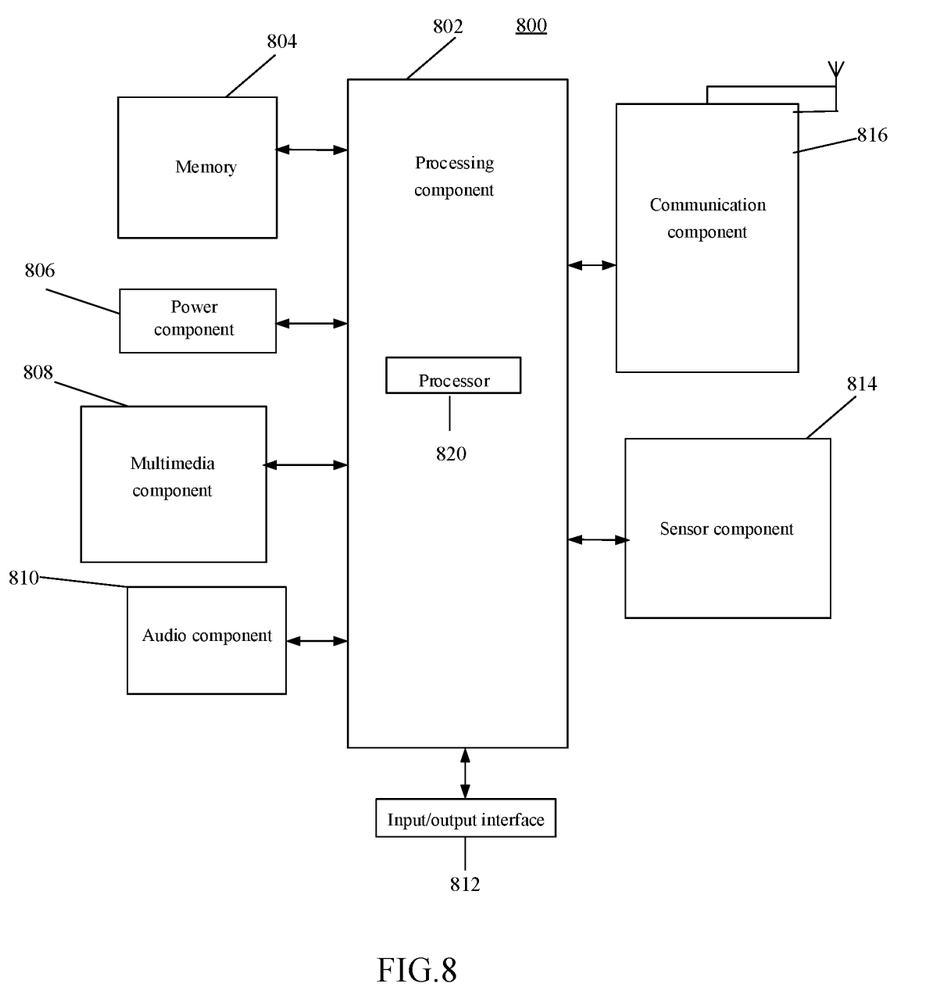
FIG. 8 is a schematic structural diagram of a terminal according to an embodiment.

FIG. 8 is a block diagram of a terminal (UE) 800 according to an embodiment. For example, the terminal 800 may be a mobile phone, a computer, a digital broadcasting terminal, a messaging device, a game console, a tablet device, a medical device, a fitness device, a personal digital assistant, or the like.

Referring to FIG. 8, the terminal 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support the operation at the terminal 800. Examples of these data include instructions for any application or method operating on the terminal 800, contact data, phone book data, messages, pictures, videos and the like. The memory 804 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 806 provides power to various components of the terminal 800. The power component 806 may include a power management system, one or more power supplies, and other components associated with generating, managing, and distributing power for the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera may be a fixed optical lens system or have focal length and optical zoom capabilities.

The audio component 810 is configured to output and/or input audio signals. For example, the audio component 810 includes a microphone (MIC), and when the terminal 800 is in an operation mode, such as a call mode, a recording mode, and a voice recognition mode, the microphone is configured to receive an external audio signal. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to home button, volume button, start button, and lock button.

The sensor component 814 includes one or more sensors for providing the terminal 800 with various aspects of state evaluation. For example, the sensor component 814 can detect the on/off status of the terminal 800 and the relative positioning of components. For example, the component is a display and keypad of the terminal 800. The sensor component 814 can also detect the position change of the terminal 800 or a component of the terminal 800, the presence or absence of contact between the user and the terminal 800, the orientation or acceleration/deceleration of the terminal 800, and the temperature change of the terminal 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as WiFi, 2G, or 3G, or a combination thereof. In an embodiment, the communication component 816 receives a broadcast signal or broadcast related information from an external broadcast management system via a broadcast channel. In an embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the terminal 800 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 804 including instructions, and the instructions may be executed by the processor 820 of the terminal 800 to complete the foregoing method. For example, the non-transitory computer-readable storage medium may be ROM, random access memory (RAM), CD-ROM, magnetic tape, floppy disk, optical data storage device and the like.

Figure 9:
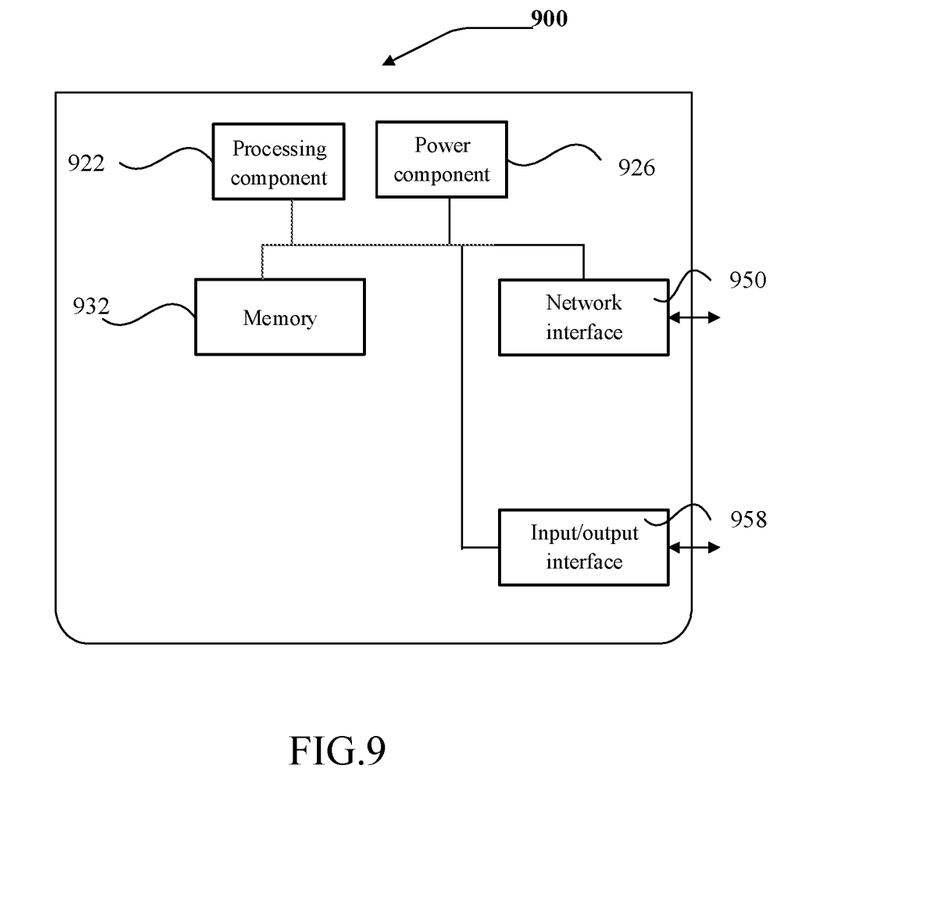
FIG. 9 is a schematic structural diagram of a base station according to an embodiment.

As shown in FIG. 9, an embodiment of the present disclosure provides a structure of a base station. For example, the base station 900 may be provided as a device at the network side. Referring to FIG. 9, the base station 900 includes a processing component 922 which further includes one or more processors, and a memory resource which is represented by a memory 932 and is configured for storing instructions such as application programs executable by the processing component 922. The application program stored in the memory 932 may include one or more modules each corresponding to a set of instructions. Furthermore, the processing component 922 is configured to execute instructions to perform any one of the above methods applied in the base station, for example, the method shown in FIG. 2, FIG. 3A, FIG. 3B, and FIGS. 4 to 5.

The base station 900 may also include a power component 926 configured to perform power management of the base station 900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, Free BSD™ or the like.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for detecting a control channel, comprising:
in response to determining that a detection complexity of a to-be-detected control channel exceeds a detection capability range of a terminal, abandoning, by the terminal, a detection of at least part of the to-be-detected control channel,
wherein abandoning the detection of the at least part of the to-be-detected control channel comprises:
abandoning, according to a channel condition of the terminal, a detection of a part of the to-be-detected control channel corresponding to an aggregation level not matching a current channel condition.

2. The method according to claim 1, wherein in response to determining that the detection complexity of the to-be-detected control channel exceeds the detection capability range of the terminal, abandoning the detection of the at least part of the to-be-detected control channel comprises:
in response to determining that a number of resources corresponding to the to-be-detected control channel exceeds a number of detections supported by the terminal, abandoning the detection of the at least part of the to-be-detected control channel.

3. The method according to claim 1, wherein abandoning the detection of the at least part of the to-be-detected control channel further comprises at least one of followings:
abandoning, according to a priority of a service scheduled by the to-be-detected control channel, a detection of the to-be-detected control channel with a scheduled priority meeting a first preset condition; or
abandoning, according to a delay requirement of a service scheduled by the to-be-detected control channel, the detection of the to-be-detected control channel with a scheduled delay requirement meeting a second preset condition.

4. The method according to claim 1, wherein abandoning, according to the channel condition of the terminal, the detection of the part of the to-be-detected control channel corresponding to the aggregation level not matching the current channel condition comprises:
in response to determining that the channel condition meets a preset condition, abandoning a detection of a part of the to-be-detected control channel corresponding to the aggregation level greater than a preset threshold; and
in response to determining that the channel condition does not meet the preset condition, abandoning a detection of a part of the to-be-detected control channel corresponding to the aggregation level smaller than the preset threshold.

5. The method according to claim 1, further comprising:
receiving, by the terminal, configuration information transmitted by a base station, wherein the configuration information is configured to indicate a detection configuration of the control channel, and
wherein in response to determining that the detection complexity of the to-be-detected control channel exceeds the detection capability range of the terminal, abandoning the detection of the at least part of the to-be-detected control channel comprises:
in response to determining, according to the configuration information, that the detection complexity of the to-be-detected control channel exceeds the detection capability range of the terminal, abandoning the detection of the at least part of the to-be-detected control channel.

6. The method according to claim 5, further comprising:
transmitting, by the terminal, detection status information of the to-be-detected control channel, wherein the detection status information at least comprises indication information regarding whether a control channel detection has been performed according to the configuration information of the base station.

7. The method according to claim 6, further comprising:
determining, by the terminal, a time point of transmitting the detection status information according to a time relationship between a time point of detecting control signaling and the time point of transmitting the detection status information.

8. The method according to claim 6, wherein the detection status information further comprises detection result identification information of a detected control channel.

9. The method according to claim 6, further comprising:
receiving, by the terminal, the configuration information updated by the base station according to the detection status information.

10. A method for transmitting information, comprising:
receiving, by a base station, detection status information, wherein the detection status information is configured to indicate that a detection of at least part of a to-be-detected control channel is abandoned in response to determining that a detection complexity of the to-be-detected control channel exceeds a detection capability range of a terminal,
wherein the detection status information is configured to indicate that a detection of a part of the to-be-detected control channel corresponding to an aggregation level not matching a current channel condition is abandoned according to a channel condition of the terminal.

11. The method according to claim 10, further comprising:
transmitting, by a base station, configuration information, wherein the configuration information is configured to indicate a detection configuration of a control channel, and the detection configuration is also configured for the terminal to determine that the detection complexity of the to-be-detected control channel exceeds the detection capability range of the terminal.

12. The method according to claim 11, further comprising:
determining, by a base station and according to the detection status information, whether the terminal has performed control channel detection according to the configuration information of the base station.

13. The method according to claim 12, further comprising:
transmitting, by a base station and according to the detection status information, updated configuration information to the terminal.

14. A device for detecting a control channel, which is applied in a terminal, comprising:
a processor; and
a memory storing instructions executable by the processor,
wherein the processor is configured to execute the instructions to implement:
in response to determining that a detection complexity of a to-be-detected control channel exceeds a detection capability range of the terminal, abandoning a detection of at least part of the to-be-detected control channel,
wherein abandoning the detection of the at least part of the to-be-detected control channel comprises:
abandoning, according to a channel condition of the terminal, a detection of a part of the to-be-detected control channel corresponding to an aggregation level not matching a current channel condition.

15. The device according to claim 14, wherein in response to determining that the detection complexity of the to-bedetected control channel exceeds the detection capability range of the terminal, abandoning the detection of the at least part of the to-be-detected control channel comprises:

in response to determining that a number of resources corresponding to the to-be-detected control channel exceeds a number of detections supported by the terminal, abandoning the detection of the at least part of the to-be-detected control channel.

16. The device according to claim 14, wherein abandoning the detection of the at least part of the to-be-detected control channel further comprises at least one of followings:

abandoning, according to a priority of a service scheduled by the to-be-detected control channel, a detection of the to-be-detected control channel with a scheduled priority meeting a first preset condition; or abandoning, according to a delay requirement of a service scheduled by the to-be-detected control channel, the detection of the to-be-detected control channel with a scheduled delay requirement meeting a second preset condition.

17. The device according to claim 14, wherein abandoning, according to the channel condition of the terminal, the detection of the part of the to-be-detected control channel corresponding to the aggregation level not matching the current channel condition comprises:

in response to determining that the channel condition meets a preset condition, abandoning a detection of a part of the to-be-detected control channel corresponding to the aggregation level greater than a preset threshold; and in response to determining that the channel condition does not meet the preset condition, abandoning a detection of a part of the to-be-detected control channel corresponding to the aggregation level smaller than the preset threshold.

18. The device according to claim 14, wherein the processor is further configured to execute the instructions to implement:

receiving configuration information transmitted by a base station, wherein the configuration information is configured to indicate a detection configuration of the control channel, and wherein in response to determining that the detection complexity of the to-be-detected control channel exceeds the detection capability range of the terminal, abandoning the detection of the at least part of the to-be-detected control channel comprises:

in response to determining, according to the configuration information, that the detection complexity of the to-be-detected control channel exceeds the detection capability range of the terminal, abandoning the detection of the at least part of the to-be-detected control channel.

19. The device according to claim 18, wherein the processor is further configured to execute the instructions to implement:

transmitting detection status information of the to-be-detected control channel, wherein the detection status information at least comprises indication information regarding whether a control channel detection has been performed according to the configuration information of the base station.

20. The device according to claim 19, wherein the processor is further configured to execute the instructions to implement:

determining a time point of transmitting the detection status information according to a time relationship between a time point of detecting control signaling and the time point of transmitting the detection status information.

* * * * *